United States Patent Office 3,810,840
Patented May 14, 1974

3,810,840

METHOD OF MANUFACTURING A MAGNETIC TAPE LACQUER, AND A MAGNETIC TAPE MANUFACTURED WITH SAID LACQUER

Johannes van Ruler and Pieter Cornelis Scholten, Emmasingel, Eindhoven, Netherlands, assignors to U.S. Philips Corporation, New York, N.Y.

No Drawing. Filed May 11, 1972, Ser. No. 252,188
Claims priority, application Netherlands, May 15, 1971, 7106701
Int. Cl. H01f *1/28*
U.S. Cl. 252—62.54 3 Claims

ABSTRACT OF THE DISCLOSURE

A method of manufacturing a magnetic tape lacquer in which a polymer is used as a dispersing agent for the magnetizable particles. When using nitrocellulose, suitable solvents are acetic acid esters or propyl alcohol, butyl alcohol, isobutyl alcohol, amyl alcohol and isoamyl alcohol and methyl-ethyl ketone, methyl-n-butyl ketone, methyl-isobutyl ketone, methyl-n-amyl ketone and methyl-isoalkyl ketone and mixtures thereof.

The invention relates to a method of manufacturing a magnetic tape lacquer in which first a dispersion of magnetizable particles in an organic solvent is prepared while using a polymeric material as a dispersing agent, whereafter a lacquer binder is added to the dispersion. The invention also relates to magnetic tapes obtained by providing a magnetic tape lacquer according to the invention on a support.

Magnetic tapes having a high signal and a low noise level can only be obtained if in the manufacture of the magnetic tape lacquer, which is used for the manufacture of these tapes, an optimum homogeneous dispersion of the magnetizable particles in the lacquer is obtained. Magnetizable particles easily form aggregates. By grinding in ball mills or pearl mills in the presence of dispersing agents and a solvent, attempts have been made to distintegrate these aggregates. Usually it takes several hours of grinding before a more or less homogeneous dispersion is obtained in which the aggregates are sufficiently small. However, when grinding for a long period a steadily increasing part of the magnetizable particles is damaged. In the finished tape this becomes manifest in a decrease of the signal level.

The use of polymeric dispersing agents is known as such (see, for example, United Kingdom patent specifications 1,058,426 and 1,132,957).

Polymers are used as dispersing agents because these are much more effective than the conventional dispersing agents such as oleic acid and lecithin for the dispersion of magnetizable particles. For the action of a polymer as a dispersing agent, it is necessary that the polymer is adsorbed on the particles. In view of the polar character of the particles to be dispersed, a polymer which carries polar groups is most suitable for this purpose. The solvent must not disturb this adsorption; this means that the solvent must not adsorb on the particles to a stronger extent than the polymeric molecules and that the solvatation of the polymeric molecules must not be of such a nature that the polar groups are shielded thereby.

An object of the present invention is to provide a method of manufacturing magnetic tape lacquers by which high-quality magnetic tapes can be manufactured. A further object of the invention is to avoid the use of low molecular weight dispersing agents.

According to the invention this method is characterized in that first a solution is prepared of a nitrocellulose having a nitrogen content of between 11.5 and 12.5% in a solvent chosen from the group formed by the acetic acid esters of propyl alcohol, butyl alcohol, isobutyl alcohol, amyl alcohol and isoamyl alcohol respectively, methyl-ethyl ketone, methyl-n-butyl ketone, methyl-isobutyl ketone, methyl-n-amyl ketone and methyl-isoamyl ketone and mixtures of these solvents, having a solid content of between 0.5 and 5%, in which 3 to 7% by vol. of magnetizable particles are dispersed, whereafter a lacquer binder is added to the dispersion.

The invention is based on the recognition of the fact that for obtaining an optimum result the non-adsorbed parts of the adsorbed polymer molecules must greatly swell in the solvent so that the layer of polymer molecules adsorbed on the particles is very extensive and that the optimum degree of homogeneity can only be achieved if in the manufacture of the dispersion during the first stage both the concentration of the polymeric dispersing agent and that of the magnetizable particles is chosen to be low and within the given limits.

A polymer of the type used in the method according to the invention is a product marketed under the name of "Walsroder Collodionwolle E 1440" by Wolff und Co. (Walsrode, Germany). (N-content approximately 12%, viscosity 2% by weight solution in acetone approximately 50 cp. at 25° C.) Generally optimum results are obtained with a nitrocellulose whose *k*-value according to Fikentscher is between 0.06 and 0.14.

It was found that when using polymers of this type and when using said solvents optimum results are obtained, but the said solvents can be diluted to several tens of percents.

When using other conventional lacquer solvents, the polymers of the described type cannot act as a dispersing agent for magnetizable particles.

It was found that the use of low molecular dispersing agents in the lacquers manufactured in accordance with the method according to the invention is unnecessary and generally has a detrimental effect on the quality of the magnetic tape manufactured with such a lacquer.

The method according to the invention is suitable for the manufacture of magnetic tape lacquers which contain the conventional magnetizable materials. When manufacturing the lacquers the following materials may be used, for example: metallic magnetic materials such as iron particles or oxidic magnetic materials such as gamma iron oxide ($\gamma$-$Fe_2O_3$), magnetite ($Fe_3O_4$), chromium dioxide ($CrO_2$) or ferrites. After the dispersion is obtained during the first stage, a lacquer binder is added during the second stage. It is not necessary that this binder is the same as the polymer which is used in preparing the dispersion, but the character of the medium may not change thereby to such a great extent that the action of the first polymer as a dispersing agent is annihilated.

Suitable for use as a lacquer binder may be acrylates, vinyl chloride acetate and vinyl acetate (co)polymers, butadiene and styrene (co)polymers, isocyanate resins and cellulose derivative particularly nitrocellulose.

The materials optionally to be added to the magnetic tape lacquer such as lubricants, plasticizers and antistatic means must be chosen carefully. They must not be able to displace the polymer adsorbed on the magnetizable particles or change the character of the solvent drastically. Generally the use of materials having strong polar groups must be avoided.

Silicon oils may be used, for example, as lubricants.

During the first stage of the method according to the invention a dispersion is obtained by grinding the mixture of magnetizable particles, dispersing agents and solvent in a ball or pearl mill for several hours.

After a homogeneous dispersion is obtained in this manner, a lacquer binder is added and grinding is continued for several hours so as to distribute the added lacquer binder homogeneously.

The magnetic tape lacquer according to the invention may be provided on the conventional supports such as foils of polyvinyl chloride, cellulose acetate and polyethylene terephthalate. Optionally, an intermediate layer enhancing the adhesion may be used. The lacquers may alternatively be provided on aluminium drums, discs etc. or on a further non-magnetic material.

The lacquers are provided on the support in accordance with methods which are conventional in the manufacture of magnetic tapes, for example, by means of pouring or spraying.

After the particles are provided on the support, they can be aligned by means of a method suitable for this purpose in the lacquer layer which is not yet dry.

A preferred embodiment of the invention for the manufacture of a magnetic tape lacquer is characterized in that a solution is prepared of nitrocellulose having a nitrogen content of approximately 12% and a *k*-value of approximately 0.14 in butyl acetate comprising 0.8 to 5 grams of polymer per 100 grams of solution in which 20 to 50 grams of oxidic magnetizable particles are dispersed, whereafter so much of a concentrated solution of a nitrocellulose having a comparatively low molecular weight is added to the dispersion that the total quantity of nitrocellulose lies between 20 and 60 grams per 100 grams of magnetizable material.

This embodiment has the advantage that the adsorption balance of the dispersing agent cannot be disturbed by the added binder.

The method according to the invention will be described in detail with reference to the following examples.

EXAMPLE 1

59 grams of needle-shaped magnetic chromium dioxide powder is dispersed for 16 hours in a pearl mill together with 177 grams of a 1% solution of nitrocellulose "E 1440" in butyl acetate.

Subsequently, 8.2 grams of nitrocellulose "E 330" dissolved in 22.5 grams of butyl acetate and 1.25 grams of silicon oil are added while stirring for half an hour after each addition. The suspension is separated from the balls and is provided on a polyester foil. After drying and calendering the signal-to-noise ratio is 3 db higher than that of the best $CrO_2$ tape commercially available.

EXAMPLE 2

50 grams of needle-shaped magnetic chromium dioxide powder is dispersed for 16 hours with the aid of a pearl mill in 127.5 grams of a 1.1% solution of nitrocellulose E 1440 in butyl acetate.

Subsequently the following additions are successively made:

(1) 31.85 grams of a 20% solution of a polyester resin (Desmophen 800 of the firm of Bayer) in butyl acetate,
(2) 43.25 grams of a 20% solution of a reaction product of trimethylolpropane and toluenediisocyanate (Desmodur L, Bayer) in butyl acetate,
(3) $1.5 \times 10^{-4}$ grammol of stannic chloride and
(4) 2.5 grams of silicon oil.

Stirring takes approximately half an hour after each addition.

The suspension is separated from the balls and provided on a polyester foil.

After drying and calendering the tape has a signal-to-noise ratio which is 2.5 db better than the said commercial tape while in addition the resistance to wear of this tape is sufficient for use in video registration.

EXAMPLE 3

50 grams of needle-shaped magnetic chromium dioxide powder is dispersed for 16 hours with the aid of a pearl mill in 150 grams of a 2.75% solution of nitrocellulose "E 950" (Wolff und Co) in methyl-ethyl ketone.

Subsequently the following additions are made: 43.2 grams of a 21.23% solution of nitrocellulose "E 330" (Wolff und Co) and 52.4 grams of a 14% solution of Estane 5702, a polyester urethane resin of the firm B. F. Goodrich, in methyl-ethyl ketone and stirring is effected for another hour. After separation of the balls 0.5 gram of silicon oil is admixed per 100 grams of lacquer. The suspension is filtered and applied on a polyester foil. After drying and calendering the tape obtained likewise has a satisfactory signal-to-noise ratio and has a resistance to wear which is sufficient for video registration.

What is claimed is:

1. A method of manufacuring a magnetic tape lacquer comprising preparing a solution of a nitrocellulose having a nitrogen content of between 11.5 and 12.5% in a solvent selected from the group consisting of propyl acetate, butyl acetate, isobutyl acetate, amyl acetate, isoamyl, acetate, methyl-ethyl ketone, methyl-n-butyl ketone, methyl isobutyl ketone and mixtures thereof, said resultant solution having a solid content of between 0.5 and 5%, dispersing 3 to 7% by volume of magnetizable particles in said solution and then adding a lacquer binder selected from the group consisting of the polyacrylates, vinyl chloride-vinyl acetate copolymers, butadiene-styrene copolymers, polyesters, isocyanate resins and nitrocellulose.

2. The method of claim 1 comprising forming a solution of nitrocellulose having a nitrogen content of approximately 12% in butyl acetate in an amount such that for each 100 grams of solution 0.8 to 5 grams of nitrocellulose is present, dispersing 20 to 50 grams of oxidic magnetizable particles in each 100 grams of solution and then adding to the resultant dispersion, a concentrated solution of a nitrocellulose having a lower molecular weight in an amount such that the total amount of nitrocellulose lies between 20 and 60 grams per 100 grams of the magnetizable material.

3. The method of claim 1 wherein the lacquer binder is a mixture of a polyester having a plurality of hydroxyl groups per molecule and of a multivalent isocyanate and the amount of lacquer binder added to the dispersion plus the content of nitrocellulose lies between 20 to 60 grams per 100 grams of magnetizable material.

References Cited

UNITED STATES PATENTS

| | | | |
|---|---|---|---|
| 2,978,414 | 4/1961 | Hartz et al. | 252—62.54 |
| 3,220,843 | 11/1965 | Louick et al. | 252—62.54 |
| 3,243,376 | 3/1966 | Louick et al. | 252—62.53 |
| 3,630,771 | 12/1971 | Akashi | 252—62.54 |
| 3,689,317 | 9/1972 | Akashi | 252—62.54 |
| 3,713,887 | 1/1973 | Stimson | 252—62.54 |
| 3,728,262 | 4/1973 | Lemmen | 252—62.54 |

DANIEL E. WYMAN, Primary Examiner

A. P. DEMERS, Assistant Examiner

U.S. Cl. X.R.

117—235; 252—62.53